US010776655B1

(12) United States Patent
Newman et al.

(10) Patent No.: US 10,776,655 B1
(45) Date of Patent: Sep. 15, 2020

(54) ESTIMATING COLOR OF VEHICLES ON A ROADWAY

(71) Applicant: Banjo, Inc., South Jordan, UT (US)

(72) Inventors: Joshua J. Newman, Salt Lake City, UT (US); Ravi Shankar Kannan, Sandy, UT (US); Krishnamohan Pathicherikollamparambil, Salt Lake City, UT (US)

(73) Assignee: Banjo, Inc., South Jordan, UT (US)

( * ) Notice: Subject to any disclaimer, the term of this patent is extended or adjusted under 35 U.S.C. 154(b) by 0 days.

(21) Appl. No.: 16/845,003

(22) Filed: Apr. 9, 2020

Related U.S. Application Data

(60) Provisional application No. 62/831,459, filed on Apr. 9, 2019.

(51) Int. Cl.
*G06K 9/46* (2006.01)
*G06K 9/00* (2006.01)
*G06T 7/90* (2017.01)
*G06T 7/73* (2017.01)

(52) U.S. Cl.
CPC ....... *G06K 9/4652* (2013.01); *G06K 9/00785* (2013.01); *G06T 7/74* (2017.01); *G06T 7/90* (2017.01); *G06K 2209/23* (2013.01); *G06T 2207/10024* (2013.01); *G06T 2207/30248* (2013.01); *G06T 2210/12* (2013.01)

(58) Field of Classification Search
CPC ............ G06K 9/4652; G06K 9/00785; G06K 2209/23; G06T 7/90; G06T 7/74; G06T 2207/10024; G06T 2207/30248; G06T 2210/12
See application file for complete search history.

(56) References Cited

U.S. PATENT DOCUMENTS

| 2016/0148072 A1* | 5/2016 | Chan ................. G06K 9/00771 382/104 |
| 2019/0197729 A1* | 6/2019 | Liang .................. G06K 9/6227 |
| 2020/0125095 A1* | 4/2020 | Lengsfeld ............ G05D 1/0088 |

FOREIGN PATENT DOCUMENTS

| CN | 107844745 | * 10/2017 |
| CN | 108875600 | * 5/2018 |

OTHER PUBLICATIONS

Zapletal et al., "Vehicle Re-Identification for Automatic Video Traffic Surveillance", The IEEE Conference on Computer Vision and Pattern Recognition (CVPR) Workshops, 2016, pp. 25-31 (Year: 2016).*

(Continued)

*Primary Examiner* — Qian Yang
(74) *Attorney, Agent, or Firm* — Dodd Law Group; Michael B. Dodd

(57) ABSTRACT

The present invention extends to methods, systems, and computer program products for estimating color of vehicles on a roadway. The color can be at least estimated from captured imagery, such as, frames of a video stream. The captured imagery can be captured by variably configured traffic cameras, other public cameras, private cameras (e.g., CCTV), or virtually any other camera, etc., which may have different operating conditions. Color confidence scores can be derived based on image characteristics.

20 Claims, 4 Drawing Sheets

(56) References Cited

OTHER PUBLICATIONS

Gao et al., "Vehicle Detection Based on Color and Edge Information", International Conference Image Analysis and Recognition ICIAR 2008: Image Analysis and Recognition pp. 142-150 (Year: 2008).*

Saini et al. "A Detection System for Stolen Vehicles Using Vehicle Attributes With Deep Learning", 5th IEEE International Conference on Signal Processing, Computing and Control (ISPCC 2k19), Oct. 10-12, 2019, JUIT, Solan, India (Year: 2019).*

Machine translation for CN 107844745 (Year: 2017).*

Machine translation for CN 108875600 (Year: 2018).*

Sochor et al. "BoxCars: Improving Fine-Grained Recognition of Vehicles Using 3-D Bounding Boxes in Traffic Surveillance", IEEE Transactions on Intelligent Transportation Systems, vol. 20, No. 1, Jan. 2019 (Year: 2019).*

* cited by examiner

ESTIMATING COLOR OF VEHICLES ON A ROADWAY

CROSS-REFERENCE TO RELATED APPLICATIONS

This application claims the benefit of U.S. Provisional Patent Application Ser. No. 62/831,459, entitled "Estimating Color Of Vehicles On A Roadway", filed Apr. 9, 2019, which is incorporated herein in its entirety.

BACKGROUND

1. Background and Relevant Art

In metropolitan areas, traffic cameras are frequently used to monitor traffic patterns and imagery from the traffic cameras is typically accessible to the public. For example, many state departments of transportation have websites where images from the state's traffic cameras can be viewed. Authorities can use imagery from traffic cameras as a basis for sending traffic alerts, dispatching first responders, etc.

Other public cameras are also used to monitor government buildings, parks, locations, people in public areas, etc. Due to location and orientation, these other public cameras may have part of a roadway within their field of view. Privately owned cameras may also include part of a roadway within their field of view.

BRIEF SUMMARY

Examples extend to methods, systems, and computer program products for estimating color of vehicles on a roadway.

In one aspect, a request is received from an entity to detect vehicles of a specified color traveling on roadways within a geographic area. A camera image is accessed. The camera image is of an unknown resolution and of an unknown quality and was captured by a camera of an unknown configuration. Part of a roadway within the geographic area is within the field of view of the camera.

A plurality of image characteristics of the camera image is determined. A darkness level in the camera image is detected. A contrast is computed from a plurality of different locations in the camera image. An entropy of the camera image is calculated. A vehicle is detected in the camera image taking into account at least some of the plurality of image characteristics.

One or more scored bounding boxes around the detected vehicle are formulated. Bound box formulation includes, for each of one or more vehicle type specific detection models: computing a bounding box around the detected vehicle, calculating a vehicle confidence score that the detected vehicle is a specified vehicle type, and selecting a bounding box indicative of a specific vehicle type from the one or more bounding boxes based on calculated confidence scores.

A vehicle color is derived from camera image pixel color values inside the selected bounding box. A color confidence score that the derived vehicle color is the specified color is computing based on: detecting the vehicle, the vehicle color, the darkness level, the contrast, and the entropy. The vehicle detection, the derived vehicle color, and the computed confidence score are sent to the entity in response to the request.

In another aspect, a camera image of an unknown quality captured by a traffic camera of an unknown configuration is accessed. One or more image characteristics of the camera image are determined. A bounding box indicative of a specific vehicle type is selected from the one or more bounding boxes based on calculated confidence scores and taking into account image content and image characteristics.

A cluster configuration setting is accessed. The cluster configuration setting defines that bounding boxes are to be divided into a specified number of color clusters. The contents of the bounding box are divided into a plurality of variably sized color clusters within the bounding box based on color differentiation between pixels within the bounding box and in accordance with the cluster configuration setting.

For each variably sized color cluster included in the plurality of variably sized color clusters: a color is matched to the variably sized color cluster based on color values of pixels contained in the color cluster and a corresponding percentage of the bounding box area represented by the variably sized color cluster is determined. A vehicle color is derived from the matched colors and corresponding percentages.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1A:
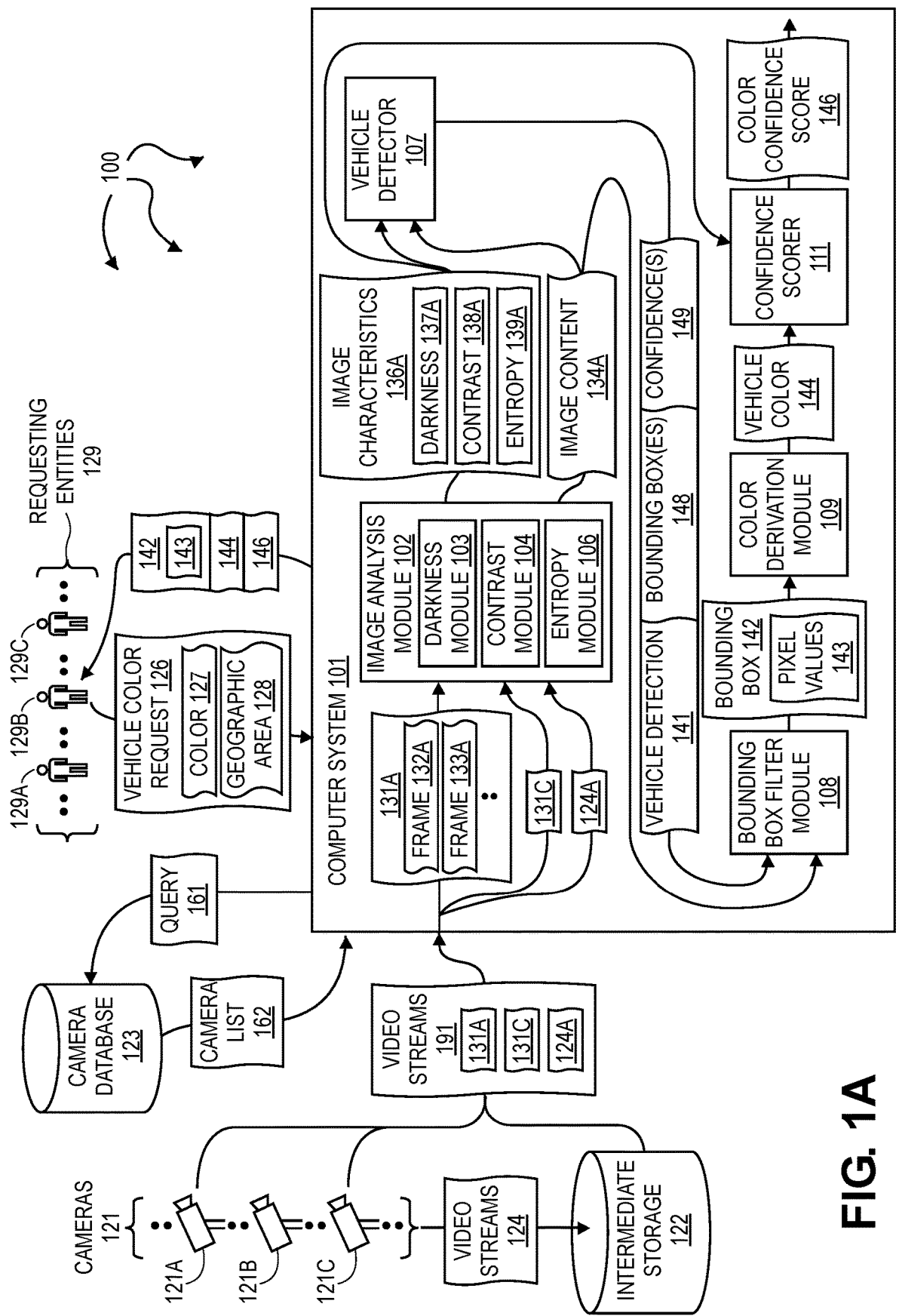
FIG. 1A illustrates an example computer architecture that facilitates at least estimating the color of vehicles traveling in a roadway.

Examples extend to methods, systems, and computer program products for estimating color of vehicles on a roadway. In some aspects, vehicle color is at least estimated (and potentially detected) for vehicles traveling on a roadway. The color can be at least estimated from captured imagery, such as, frames of a video stream. The captured imagery can be captured by dedicated traffic cameras, other public cameras, private cameras (e.g., CCTV), or virtually any other camera, etc. When an incident occurs, authorities may be interested in the location of vehicles traveling on roadways that fit the general description of vehicles of interest in the incident (e.g., when a vehicle of a particular color is allegedly involved in criminal activity, such as, for example, a bank robbery, a child abduction, etc.)

Installation of traffic cameras is usually on an "as needed" basis. As traffic in an area increases, a jurisdiction (e.g., a state department of transportation, a city, etc.) may install a camera to monitor the traffic. Thus, traffic cameras can have varied capabilities and configurations. For example, if a traffic camera is installed in an intersection and 5 years later another traffic camera installed in an adjacent intersection, it is likely the capabilities and configuration of the other (new) camera is far superior. Other public cameras may also be installed on an "as needed" basis as foot traffic in area increases, new government facilities are constructed, etc. Private cameras may also be installed in different locations at different times.

As such, over time, cameras of different capabilities and configurations can be installed in different locations. Camera capabilities and configurations can vary widely between different traffic cameras, other public cameras, and privately owned cameras. Older cameras may generate images having reduced resolution, may have lens damage due to prolonged sun exposure (depending on location and orientation), may have other component degradation due to basic wear and tear, etc. On the other hand, newer cameras can generate images having higher resolution and may have little, if any, component degradation.

Additionally, other external conditions, such as, road conditions (pavement color, traffic congestion, etc.), weather conditions (snow, rain, fog, etc.), environmental conditions (e.g., fire, smoke, smog, etc.), light conditions (night, twilight, etc.), camera distance from a roadway, camera orientation relative to a roadway, etc., may impact (degrade, reduce, etc.) image quality and reduce the ability to detect vehicle color in traffic camera images. Traffic cameras are often located and oriented to have expansive views including as much roadway as possible, including multiple directions of travel. Traffic may be moving both towards and away from a traffic camera simultaneously and/or traffic may pass through a camera's viewing area essentially perpendicularly (or at other angles), for example, from a cross street.

As such, the resolution and quality of imagery (e.g., video stream frames) from different cameras may vary widely, even between cameras in close geographic proximity to one another. The quality of imagery from the same camera can also vary over time as external conditions at the camera change and/or components degrade.

There are tens of thousands of traffic cameras managed by departments of transportation in the United States. There are also tens of thousands, or perhaps even hundreds of thousands, of other public cameras in the United States that include portions of roadways within their field of view (not to mention private cameras and cameras in other countries). As described, the cameras can have varied capabilities and configurations and each traffic (or other) camera may be subject to different external conditions at different and varied times. Thus, systems configured to process camera imagery, for example, to detect vehicle color, may receive a relatively high volume of images (e.g., hundreds of thousands, or even millions, of video stream frames) having varied resolutions and qualities.

However, law enforcement, other authorities, other government entities, etc. may desire to know the color of vehicles contained in imagery as soon as possible when an incident occurs. Due to the possible varied combinations from thousands of cameras, it is both technically and financially impractical to tune vehicle color detection mechanisms to account for all possible combinations of: camera type, camera configuration, image resolution, image quality, external conditions, etc.

Accordingly, aspects of the invention include a generalized approach to processing imagery to at least estimate (and potentially detect) the color of vehicles traveling on a roadway. Aspects include processing imagery associated with virtually any combination of imagery characteristics (metadata) that are not known apriori. Imagery characteristics (metadata) can include but are not limited to: camera type, camera configuration, image resolution, image quality, external conditions, etc., that are not known apriori. Aspects of the invention include processing (e.g., frames of) live video streams as well as processing the playback of (e.g., frames of) cached video streams and/or stored video streams to estimate (or detect) vehicle color.

In one aspect, a vehicle color and a confidence value are computed from imagery content and imagery characteristics. The confidence value indicates a likelihood (or probability) of the computed vehicle color being an actual color of the vehicle.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: video streams, video stream frames, images, image characteristics, image darkness, image contrast, image entropy, image content, object detections, vehicle detections, vehicle confidence scores, bounding boxes, pixel values, detected vehicle colors, confidence scores, vehicle color requests, desired vehicle colors, queries, camera lists, clusters, cluster colors, color confidence sores, cluster percentages, cluster settings, color spaces, image metadata, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, video streams, video stream frames, images, image characteristics, image darkness, image contrast, image entropy, image content, object detections, vehicle detections, vehicle confidence scores, bounding boxes, pixel values, detected vehicle colors, confidence scores, vehicle color requests, desired vehicle colors, queries, camera lists, clusters, cluster colors, color confidence sores, cluster percentages, cluster settings, color spaces, image metadata, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more Field Programmable Gate Arrays (FPGAs) and/or one or more application specific integrated circuits (ASICs) and/or one or more Tensor Processing Units (TPUs) can be programmed to carry out one or more of the systems and procedures described herein. Hardware, software, firmware, digital components, or analog components can be specifically tailor-designed for a higher speed detection or artificial intelligence that can enable signal processing. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

Figure 1B:
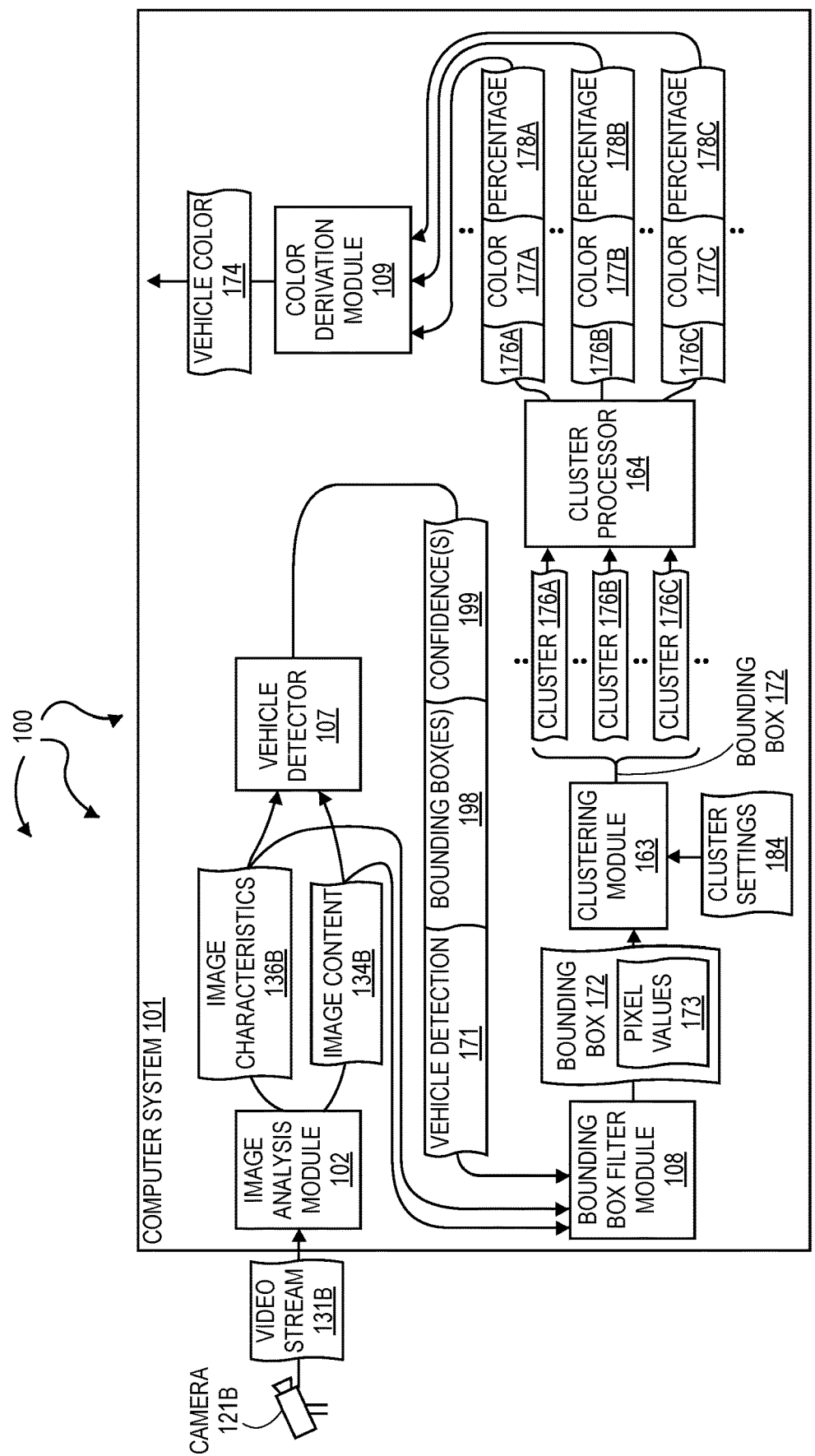
FIG. 1B illustrates an example computer architecture that facilitates at least estimating the color of vehicles traveling in a roadway.

FIGS. 1A and 1B depicts a computer architecture 100 for at least estimating (and potentially detecting) the color of vehicles traveling on a roadway. As depicted, computer architecture 100 includes computer system 101, cameras 121, intermediate storage 122, camera database 123, and entities 129. Computer system 101, cameras 121, intermediate storage 122, camera database 123, and entities 129 can be connected to (or be part of) a network, such as, for example, a system bus, a Local Area Network ("LAN"), a Wide Area Network ("WAN"), and even the Internet.

Accordingly, computer system 101, cameras 121, intermediate storage 122, camera database 123, and entities 129 as well as any other connected computer systems and their components can create and exchange data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Referring to FIG. 1A, cameras 121 includes a plurality of cameras including cameras 121A, 121B, 121C, etc. Each camera in cameras 121 may include part of a roadway within its field of view. Some of cameras 121 may be dedicated "traffic" cameras having a primary function to monitor traffic on part of one or more roadways. Other cameras may have a different primary function (building security, pedestrian monitoring, etc.) but may include part of one or more roadways within a field of view.

At least some of cameras 121 can have different capabilities and/or configuration relative to at least some other of cameras 121. For example, cameras in different jurisdictions, installed by different entities, installed at different times, installed for different purposes, etc. may have different (e.g., component, hardware, firmware, software, etc.) capabilities and/or may be configured differently (e.g., even if cameras have the same capabilities). It may also be that at least some of cameras 121 have similar (or even the same) capabilities and configuration. For example, two cameras installed at the same time in the same jurisdiction may be the same camera model with the same capabilities. Further, the two cameras may be similarly configured to perform the same primary function, for example, to monitor traffic on part of one or more roadways.

Each camera 121 can be configured to send a continual and/or on-demand video stream of the camera's observations. Video streams from some cameras can be temporarily stored, buffered, or cached, for example, at intermediate storage 122. Storing, buffering, caching, etc. can facilitate playback/review of historical footage, such as, for example, 5 minutes, 10 minutes, 30 minutes, 1 hour, 5 hours, 12 hours, 24 hours, etc. in the past. Video streams can be stored to system memory and/or to more durable storage such as magnetic disks, optical disks, solid state drives (SSDs), flash drives, etc. For example, video streams 124 from one or more of cameras 121 can be stored at intermediate storage 122 (e.g., a combination of system memory and/or more durable storage).

In one aspect, video streams are archived in circular manner where video footage older than a specified time frame (e.g., 1 minute, 5 minutes, 10 minutes, 15 minutes, 1 hour, 12 hours, 1 day, etc.) is (e.g., continually) overwritten with newer video footage on an ongoing basis. In other aspects, a jurisdiction can turn storing, buffering, caching, etc. on and/or off as desired.

Camera database 123 can store metadata for each of cameras 121. Camera database 123 can store metadata for cameras across a plurality of different jurisdictions (cities, counties, states, federal, trade zones, military enclaves, etc.) and a plurality of different entities (law enforcement, departments of transportation, other public entities, private entities, etc.). Camera database 123 can store metadata for fixed as well as mobile cameras. Metadata can include geographic location (e.g., lat/lon), elevation (or altitude), direction of orientation, angle of orientation, etc.

Cameras can update metadata in camera location database 123 when changes occur. For example, when a camera is panned, the camera can update a direction of orientation and/or an angle of orientation in camera metadata. When a mobile camera moves between locations, the camera can update lat/lon and/or elevation (altitude) in camera metadata. When a camera updates metadata, the camera in include a timestamp indicating when the camera metadata changed and/or was updated.

Entities 129 can include law enforcement entities, other governmental authorities, other authorities, etc. interested in knowing the color of vehicles traveling on one or more roadways. An entity 129 can send a vehicle color request to computer system 101. A vehicle color request can include a color and geographic area. Alternately, vehicle color requests can include a vehicle color, location, and incident time. Computer system 101 can derive a geographic area based on the location and incident time. As such, based on a color request, computer system 101 can formulate a query for relevant cameras capturing portions of roadways within the geographic area. Computer system 101 can submit the query to camera database 123.

In response to a query, camera database 123 can identify cameras having relevant portions of roadways within the geographic area within their field of view based on corresponding camera metadata. Camera database 123 can return a list of identified cameras to computer system 101. Computer system 101 can then access live video streams and/or historical footage from the identified cameras.

In some aspects (FIG. 1A), computer system 101 includes image analysis module 102, vehicle detector 107, bounding box filter module 108, color derivation module 109, and confidence scorer 111. In other aspects and alternately and/or in combination (FIG. 1B), computer system 101 includes clustering module 163 and cluster processor 164.

Image analysis module 102 includes darkness module 103, contrast module 104, and entropy module 106. Darkness module 103 is configured to determine overall "darkness" of an image. Within darker images different color detection mechanisms may be more effective relative to less dark images. Contrast module 104 is configured to determine contrast (difference in luminance) between different portions of an image.

Entropy module 106 is configured to compute the entropy of an image. Entropy is defined as an amount of information to sufficiently describe an image. A completely dark image (or an image of all one color) has reduced entropy. An image containing many different colors and different brightness has increased entropy.

In general, image analysis module 102 can compute image characteristics of an image. Image characteristics can include image quality, image resolution, darkness, contrast, entropy, etc.

Vehicle detector 107 is configured to detect vehicular objects in an image and compute one or more bounding boxes around detected vehicular objects or portions thereof in the image. Vehicle object detection and bonding box computation can be based on image content and image characteristics. Vehicle detector 107 can implement a plurality of object detection models for detecting vehicular objects. In general, each object detection model scans an image and attempts to identify portions of the image that possibly contain an object. For each identified portion, the object detection model then attempts to determine if the possibly contained object is a vehicular object (e.g., a vehicle). In one aspect, different object detection modules are configured to identify different types of vehicles, such as, for example, cars, trucks, vans, motorcycles, etc. When a relevant vehicular object is detected, the object detection model can place a bounding box around the relevant vehicular object.

As such, a plurality of object detection models can be used to detect relevant vehicular objects and compute bounding boxes around relevant vehicular objects. Image content and image characteristics of an image can be provided as input to each of the plurality of object detection models. Each object detection model can attempt to identify relevant vehicular objects and compute bounding boxes around relevant vehicular objects in the image based on the image content and the image characteristics. In some aspects, an object detection model may detect a non-vehicular object (a tree, a bush, a median, a guardrail, etc.) as a vehicular object (e.g., a car, a truck, a motorcycle, etc.).

In other aspects, different object detection models can compute different size bounding boxes around an object or portion thereof. Thus, it may be that multiple bounding boxes are computed for an object and/or portions of the object. For example, one object detection model may compute a bounding box for the semi-tractor unit of a semi-truck trailer and another object detection model may compute a bounding box for the entire semi-truck trailer. Alternately, a truck object detection model can detect an object as a truck and a car object detection model can detect the object as a car.

An object detection module can associate a score with a vehicular object detection. The score indicates how likely the object detection model is of a vehicular object detection being accurate. In one aspect, the score is a percentage indicating the object detection model's confidence in a correct detection. A higher score can indicate the object detection model has increased confidence in a vehicular object detection. For example, 95% score indicates an object detection model is more confident in a vehicular object detection than a 50% score.

It may be that multiple object detection models detect a relevant vehicular object but each object detection module detects a different type of relevant vehicular object. For example, as described, a truck object detection model can detect an object as a truck and a car object detection model can detect the same object as a car.

Vehicle detector 107 can send object detections, bounding boxes, and confidences to bounding box filter module 108. Bounding box filter module 108 can filter out some bounding boxes.

For example, various techniques can be used to filter bounding boxes that are unlikely to bound a relevant vehicle. In one aspect, the average bounding box size of bounding boxes in an image is computed. Bounding boxes varying in size from the average bounding box size by a specified amount or in a particular dimension (either larger or smaller) are removed from consideration. For example, object detection models associated with vehicle detector 107 may compute bounding boxes around a plurality of passenger vehicles and (possibly incorrectly) around a train car. However, the bounding box for the train car may be longer and narrower relative to bounding boxes for the passenger vehicles. As such, bounding box filter module 108 can filter out the bounding box for the train car. Similarly, a bounding box around a bush or tree may be sized differently than a bounding box around a car or truck. As such, bounding box filter module 108 can filter out the bounding box around the bush or tree.

Various techniques can also be used to filter duplicate bounding boxes associated with the same vehicle detection. In one aspect, when one object detection model computes a higher confidence than another object detection model, the bounding box associated with the higher confidence is retained and the bounding box with the lower confidence score is filtered out. For example, it may be that a truck object detection model detects an object as a truck with 95% confidence and a car object detection model detects the same object as a car with 70% confidence. In response, bounding box filter module 108 can filter out the bounding box for the car object detection. When multiple bounding boxes are associated with the same confidence, the multiple bounding boxes are retained for further processing (and may all be sent to a requesting entity).

In one aspect, bounding box filter module 108 sends remaining bounding boxes (i.e., bounding boxes that are not filtered out) to color derivation module 109. In general, color derivation module 109 can derive a vehicle color from pixel values contained in the bounding box. In one aspect, a derived vehicle color is sent to confidence scorer 111. Confidence scorer 111 can compute a confidence score that a derived vehicle color is actually the specified color of a vehicle based on the vehicle detection and image characteristics. For example, if a vehicle is matched to color "blue", confidence scorer 111 can compute a confidence score the vehicle is actually "blue" based on detecting the vehicle and image characteristics of the image from which the vehicle was detected.

Turing to FIG. 1B, in another aspect, bounding box filter module 108 sends remaining bounding boxes (i.e., bounding boxes that are not filtered out) to clustering module 163. Cluster module 163 can divide the contents of the bounding box into a plurality of variably sized color clusters based on color differentiation between the pixels within the bounding box. For each variable sized color cluster, cluster processor 164 can match a color to the cluster based on pixel color values contained in the cluster. For each variable sized color cluster, cluster processor 164 can determine a corresponding percentage of the bounding box area represented by the cluster.

The number of variable sized clusters can be indicated in cluster settings. Depending on pixel color value differences within a bounding box, color clusters within the bounding box can be of different sizes. A vehicle color can be derived from the matched colors and corresponding percentages. For example, if color clusters matched to a color "blue" represent 60% of a bounding box, the color "blue" can be derived for the vehicle detected to be in the bounding box.

In one aspect, K-means clustering or other similar (e.g., unsupervised) learning techniques are used to derive variable sized color clusters within a bounding box. Each pixel in a bounding box can be represented in a 5 dimensional space including a Red dimension, a Green dimension, a Blue dimension, an X dimension (e.g., horizontal), and a Y dimension (e.g., vertical). Thus, each pixel can be associated with 5 values, including a Red pixel value, a Green pixel value, a Blue pixel value, an X coordinate, and a Y coordinate, such as, for example, in the format {R, G, B, X, Y}. The X, Y coordinates can indicate pixel position within a bounding box.

Clustering module 163 can randomly define K number of centroids (the number of clusters) within bounding box. After initial centroid definition, clustering module 163 can assign each pixel to the closest corresponding centroid. In one aspect, clustering module determines a Euclidean distance between pixels and centroids in the 5 dimensional space. For each centroid, clustering module 163 calculates the mean of the values of pixels assigned to it and the mean value becomes the new value of the centroid.

Clustering module 163 can again assign each pixel to the closest corresponding centroid. Clustering module 163 again assign each pixel to the closest corresponding centroid, for example, based on Euclidean distance in the 5 dimensional space. For each centroid, clustering module 163 can again calculate the mean of the values of pixels assigned to it and the mean value again becomes the new value of the centroid.

The technique can continue iteratively over and over until change in centroid values is below a specified threshold or after a specified number of iterations is performed.

K can be selected to balance color detection accuracy against consumption of computing resources.

Clustering module 163 can send determined clusters to cluster processor 164. As described, cluster processor 164 can match a color to each cluster based on pixel color values contained in the cluster. For each variable sized color cluster, cluster processor 164 determines a corresponding percentage of the bounding box area represented by the cluster.

Figure 2:
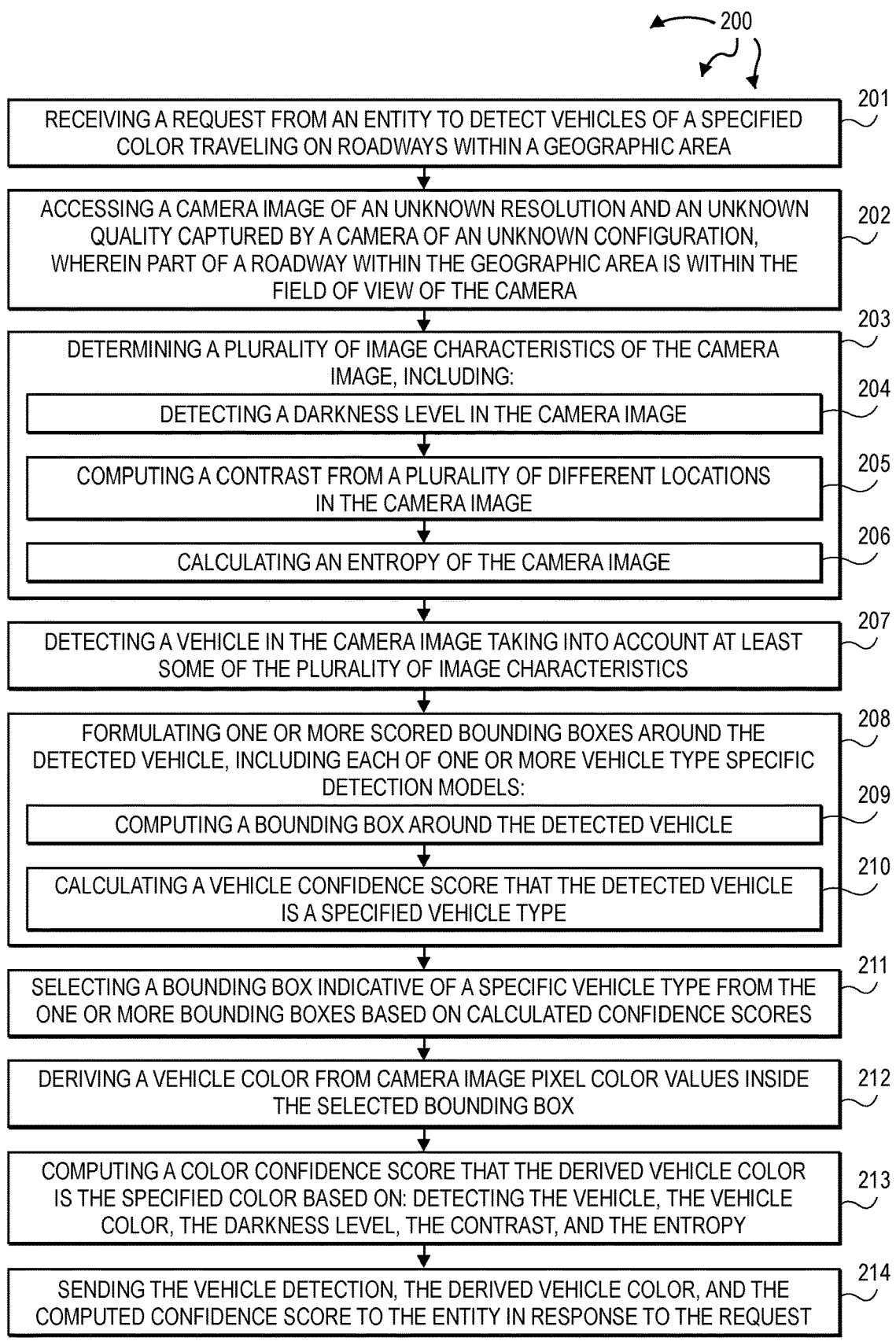
FIG. 2 illustrates a flow chart of an example method for estimating the color of a vehicle on a roadway.

FIG. 2 illustrates a flow chart of an example method 200 for estimating the color of a vehicle on a roadway. Method 200 will be described with respect to the components and data in FIG. 1A.

Method 200 includes receiving a request from an entity to detect vehicles of a specified color traveling on roadways within a geographic area (201). For example, computer system 101 can receive vehicle color request 126 from entity 129B. Vehicle color request 126 includes color 127 and geographic area 128. Color 127 can be a color, such as, for example, red, green, blue, yellow, black, white, gray, silver, etc. Geographic area 128 can specify geographic boundaries inside which entity 129B is interested in vehicles of color 127.

In response to receiving vehicle color request 126, computer system 101 can send query 161 to camera database 123. Query 161 can include boundaries of geographic area 128. Camera database 123 can compare the boundaries of geographic area 128 to camera metadata in camera database 123. Camera database 123 can generate camera list 162 of cameras that include one or more roadways in geographic area 128 within their field of view. Camera database 123 can return camera list 162 to computer system 101. Camera list 162 can include cameras 121A, 121C, and at least one other camera.

Method 200 includes accessing a camera image of an unknown resolution and an unknown quality captured by a camera of an unknown configuration, wherein part of a roadway within the geographic area is within the field of view of the camera (202). For example, computer system 101 can access video streams 191. Video streams 191 includes stream 131A from camera 121A, stream 131C from camera 121C, and stream 124A from intermediate storage 122. Stream 124A can be a previously captured stream from another camera 121 that was cached, buffered, or stored at intermediate storage 122.

Cameras 121A, 121C, and the camera that captured video stream 124A can each have different capabilities and configurations relative to one another. Further computer system 101 may be unaware of the resolution and quality of video streams 131A, 1331C, and 124A prior to accessing video streams 131A, 1331C, and 124A. For example, each of cameras 121A, 121C, and the camera that captured video stream 124A may capture video at different resolutions and/or may be associated with different external conditions impacting image quality.

More specifically, image analysis module 102 can access frames 132A, 133A, etc. from video stream 191.

Method 200 includes determining a plurality of image characteristics of the camera image (203). For example, image analysis module 102 can derive image characteristics 136A of video stream 131A from frames 132A, 133A, etc. Image characteristics can include resolution, darkness, contrast, entropy, etc.

Determining a plurality of image characteristics of the camera image includes detecting a darkness level in the camera image (204). For example, darkness module 103 can detect darkness 137A on frames 1323A, 133A, etc. Determining a plurality of image characteristics of the camera image includes computing a contrast from a plurality of different locations in the camera image (205). For example, contrast module 104 can compute contrast 138A from a plurality of different locations in frames 132A, 133A, etc. Determining a plurality of image characteristics of the camera image includes calculating an entropy of the camera image (206). For example, entropy module 106 can compute entropy 139A from frames 132A, 133A, etc.

Image analysis module 102 can send image characteristics 136A and image content 134A to vehicle detector 107.

Method 200 includes detecting a vehicle in the camera image taking into account at least some of the plurality of image characteristics (207). For example, vehicle detector 107 can formulate vehicle detection 141 from image characteristics 136A and image content 134A.

Method 200 includes formulating one or more scored bounding boxes around the detected vehicle, including each of one or more vehicle type specific detection models (208). For example, one or more object detection modules in vehicle detector 107 can formulate bounding box(es) 148 and corresponding confidence(s) 149. The confidence(s) can be scores that indicate how confident a vehicle type specific detection model is of their vehicle type detection.

Formulating one or more scored bounding boxes around the detected vehicle includes, for each vehicle type detection model, computing a bounding box around the detected vehicle (209). For example, a vehicle type specific object detection model can compute a bounding box 148 around vehicle detection 141. It is additionally possible that one or more other different vehicle type specific object detection models compute other bounding boxes 148 around vehicle detection 141. Thus, it is possible for vehicle type specific object detection models to collectively compute multiple different bounding boxes 148. For example, one vehicle type specific object detection model can compute a car bounding box and another vehicle type specific object detection model can compute a truck bounding box.

Formulating one or more scored bounding boxes around the detected vehicle includes, for each vehicle type detection model, calculating a vehicle confidence score that the detected vehicle is a specified vehicle type (210). For example, a vehicle type specific object detection model can calculate a confidence 149 that vehicle detection 141 is a specified vehicle type. It is additionally possible that one or more other different vehicle type specific object detection models compute other confidences 149 that vehicle detection 141 is another specified vehicle type. Thus, it is possible for vehicle type specific object detection models to collectively compute multiple different corresponding confidences 149. For example, one vehicle type specific object detection model can compute a confidence for a car bounding box and another vehicle type specific object detection model can compute a confidence for a truck bounding box.

Method 200 includes selecting a bounding box indicative of a specific vehicle type from the one or more bounding boxes based on calculated confidence scores (211). For example, bounding box filter module 108 can select bounding box 142 (from among bounding box(es) 148) based on confidence score(s) 149. Bounding box filter module 108 can also consider image content 134A when selecting bounding box 142. Pixel values 143 represent a color value (within a color space, for example, RGB, sRGB, LUV, CMYK, etc.) of each pixel in bounding box 142.

If multiple bounding boxes 148 have the same confidence score (or nearly the same confidence, for example, within 1-3%), bounding box filter module 108 may select the multiple bounding boxes. In general, bounding box filter module 108 can filter bounding box(es) 148 using any of the described techniques, including bounding box average size and confidence score.

Method 200 includes deriving a vehicle color from camera image pixel color values inside a bounding box that surrounds and includes the vehicle (212). For example, color derivation module 109 can derive vehicle color 144 from pixel values 143. Method 200 includes computing a color confidence score that the derived vehicle color is the specified color based on: detecting the vehicle, the vehicle color, the darkness level, the contrast, and the entropy (213). For example, confidence scorer 111 can derive color confidence score 146. Color confidence score 146 can represent a probability (or likelihood) that vehicle color 144 is actually vehicle color 127 based on vehicle detection 141, darkness 137A, contrast 138A, and entropy 139A.

Method 200 includes sending the selected bounding box and contents thereof, the derived vehicle color, and the computed confidence score to the entity in response to the request (214). For example, computer system 101 can send bounding box 142, pixels 143, vehicle color 144, and confidence score 146 to entity 129B in response to vehicle color request 126.

Computer system 101 can perform similar processing on video streams 131A and/or 124A. As such, computer system 101 can potentially identify other vehicles, derive their colors, and compute a confidence score representing a probability (or likelihood) that the derived colors are color 127.

As described, computer system 101 can also returns an image of each detected vehicle to requesting entity 129B along with the vehicle color and confidence score (e.g., pixels 143). As such, requesting entity 129B may visually determine/verify if a detected vehicle is or is not color 127.

Figure 3:
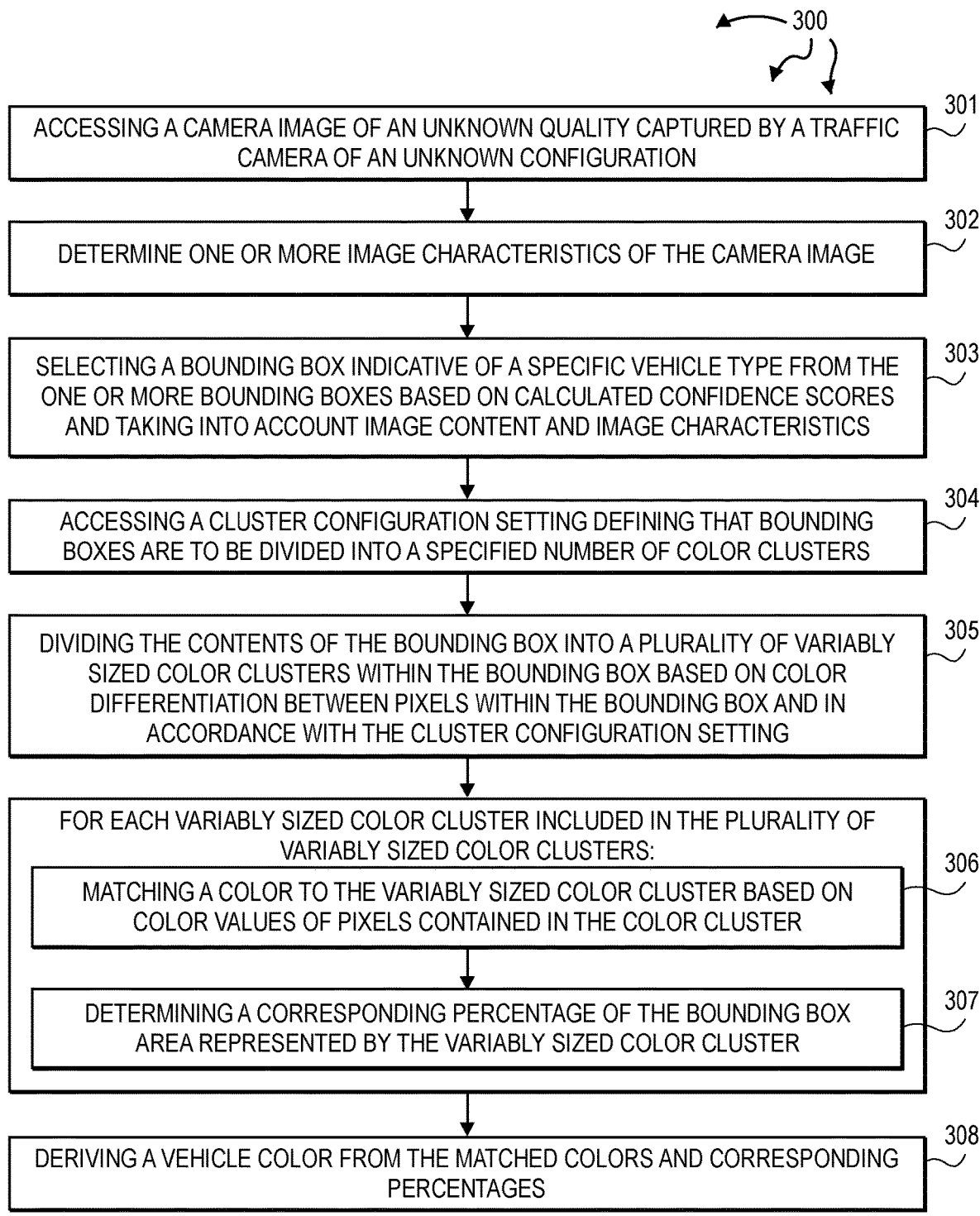
FIG. 3 illustrates a flow chart of an example method for estimating the color of a vehicle on a roadway.

FIG. 3 illustrates a flow chart of an example method 300 for estimating the color of a vehicle on a roadway. Method 300 will be described with respect to the components and data in FIG. 1B.

Method 300 includes accessing a camera image of an unknown quality captured by a traffic camera of an unknown configuration (301). For example, computer system 101 can access video stream 131B from camera 121B. Video stream 131B can be of an unknown quality and resolution and traffic camera 121B may have an unknown configuration. Camera 121B may also be subject to unknown external conditions that impact (reduce) image quality of video stream 131B.

Method 300 includes determining one or more image characteristics of the camera image (302). For example, image analysis module 102 can determine image characteristics 136B of frames of video stream 131B. Image analysis module 102 can also determine image content 134B from the frames of video stream 131B.

Vehicle detector 107 can formulate vehicle detection 171 of a vehicle in image content 134B. One or more different vehicle type specific object detection models in vehicle detector 107 can compute bounding box(es) 198 and corresponding confidence(s) 199. Vehicle detector 107 can send vehicle detection 171, bounding box(es) 198, and corresponding confidence(s) 199 to bounding box filter module 108.

Method 300 includes selecting a bounding box indicative of a specific vehicle type from the one or more bounding boxes based on calculated confidence scores and taking into account image content and image characteristics (303). For example, bounding box filter module 108 can select bounding box 172 (from among bounding box(es) 198 based on confidence score(s) 199. Bounding box filter module 108 can also consider image content 134B and image characteristics 136B when selecting bounding box 198. Pixel values 173 represent a color value (within a color space, for example, RGB, sRGB, LUV, CMYK, etc.) of each pixel in bounding box 172.

If multiple bounding boxes 198 have the same confidence score (or nearly the same confidence, for example, within 1-3%), bounding box filter module 108 may select the multiple bounding boxes. In general, bounding box filter module 108 can filter bounding box(es) 198 using any of the described techniques, including bounding box average size and confidence score.

Method 300 includes accessing a cluster configuration setting defining that bounding boxes are to be divided into a specified number of color clusters (304). Method 300 includes dividing the contents of the bounding box into a plurality of variably sized color clusters within the bounding box based on color differentiation between pixels within the bounding box and in accordance with the cluster configuration setting (305). For example, clustering module 163 can access cluster settings 184. Cluster settings 184 can define that each bounding box is to be divided into a specified number, such as, for example, 10, 20, 30, 40, or 50, color clusters. Each color cluster can include a group of pixels that are within a specified color value of one another. Thus, some color clusters can be larger (or contain more pixels) than others.

In one aspect, clustering module 163 using K-means clustering or other similar (e.g., unsupervised) learning techniques to derive variable sized color clusters within a bounding box. For example, clustering module 163 can derive color clusters 176A, 176B, 176C, etc. from pixels 173. Each of clusters 176A, 176B, 176C, etc. may contain a grouping of pixels that are within a specified color value and distance of one another (e.g., in a 5 dimensional {R, G, B, X, Y} space). Each of clusters 176A, 176B, 176C, etc. may include a different number of pixels.

For each variably sized color cluster included in the plurality of variably sized color clusters, method 300 includes matching a color to the variably sized color cluster based on color values of pixels contained in the color cluster (306). For example, cluster processor 164 can match color 177A to cluster 176A based on color values of pixels contained in cluster 176A. Cluster processor 164 can match color 177B to cluster 176B based on color values of pixels contained in cluster 176B. Cluster processor 164 can match color 177C to cluster 176C based on color values of pixels contained in cluster 176C.

For each variably sized color cluster included in the plurality of variably sized color clusters, method 300 includes determining a corresponding percentage of the bounding box area represented by the variably sized color cluster (307). For example, cluster processing module 164 can determine that cluster 176A is percentage 178A (e.g., between 0% and 100%) of bounding box 172. Cluster processing module 164 can determine that cluster 176B is percentage 178B (e.g., between 0% and 100%) of bounding box 172. Cluster processing module 164 can determine that cluster 176C is percentage 178C (e.g., between 0% and 100%) of bounding box 172.

Cluster processing module 164 can send clusters and corresponding matched colors and percentages to color derivation module 109.

Method 300 includes deriving a vehicle color from the matched colors and corresponding percentages (308). For example, color derivation module 109 can derive vehicle color 174 from clusters and corresponding matched colors and percentages.

Vehicle color 174 can be sent to confidence scorer 111. Confidence scorer 111 can generate a color confidence score corresponding to vehicle color 174. Bounding box 172, pixels 173, vehicle color 174, and the color confidence score can be sent to a requesting entity.

Thus, in general, modules and components in FIGS. 1A and 1B can interoperate to implement methods 200 and 300 as well as combinations thereof and hybrid methods implementing different portions of methods 200 and 300.

Other Implementations

In general, a traffic vision pipeline can include object detection mechanisms to detect objects and color detection mechanisms to detect object colors.

Object detection is a computer technology related to computer vision and image processing that deals with detecting instances of semantic objects of a certain class (such as humans, buildings, or vehicles) in digital images and videos. Machine-learning and deep-learning approaches to object detection can be used. In some aspects, a CNN model is used for essentially real-time object detection.

Color detection approaches can be adapted/customized based on available hardware. Convolutional neural networks (CNNs) or other neural networks may be used to detect color when Graphical Processing Units (GPUs) are available. Other machine learning (ML) techniques can also be used to detect color.

A CNN can be trained on available datasets and curated by human personnel. The CNN can accept an image or batch of images and provide a confidence (e.g., between 0 and 1) of a prediction of each output class (color). The CNN can be used for images of varied qualities and varied noise (e.g., containing colors other than vehicle colors, light reflection, poor camera quality, etc.). For images with noise, confidence scores for multiple classes can be considered. If there's a close contest between two or more classes or if the class with the highest confidence score is below a particular threshold, it can be marked it as a color prediction with a low/medium confidence score. Confidence can range from High, Medium, or Low depending upon confidence score.

A CNN can be trained to predict particular colors, such as, for example, white, grey, black, blue, red, yellow.

Other ML techniques can also be used to classify the color of the portion of the video frames where a vehicle is detected. An image (e.g., bounding box) can be cropped out for each vehicle and passed to a color classification module. The techniques can be used to detect color in images that a highly pixelated (e.g., due to low resolution). For example, vehicle color can be classified in images less than 20×20 pixels and that also include significant (e.g., up to and exceeding 50%) non-vehicle background colors. Vehicle color can also be classified when vehicles are multiple colors, for example, heavily tinted windows, tires, etc.

These techniques can be used to understand what "sort of colors" are and how much of the image is made up of those colors. With a list of colors and what percentage each color is, classification logic can be applied. For example, if an image has at least 5 clusters of "blue" and is at least 30% blue then we can safely consider this a blue car. As another example, if an image has a large amount of black and a large amount of white then it is more likely a "grey" car. To understand what "sort of colors" and how prevalent they are in the image we use a clustering technique that gives us N (e.g., 10, 20, 30, 40, or 50, etc.) clusters of colors.

For example, N clusters of color for a blue car, red care, white car, etc. can be detected. Even if there is significant amounts of black, grey, white in in an image a color can be detected if there is also a non-trivial amount of the color in the image. For each cluster, a mean color value can be calculated for the cluster. For example, a blue cluster may contain multiple shades of a similar blue, that can be averaged for the cluster. The cluster average can then be matched to a closet RGB value, such as, for example, red/green/blue/white/black/grey/yellow. A cluster can be represented as a number of colors and percentage values, such as: {"grey": 53%, "blue": 20%, "black": 15%, "white": 12%}. We can use that information to either put in rules can be applied to determine when a vehicle can safely be classified as blue/red/black etc. or that information can be supplied to a further model to make that decision.

In one aspect, an algorithm is as follow:
1. Resize the cropped vehicle image to (20×20) (width by height)
2. Flatten image into array of RGB values (20×20×3)
3. Cluster image RGB values into 50 color clusters using K-MEANS
4. Create a histogram of the number of pixels assigned to each cluster
5. Extract the "mean" color from each cluster
6. Compute the closest name of the "mean" color (red/blue/yellow/green) for each cluster using Manhattan Distance in RGB color space
7. Compute the closest name of the "mean" grey color (white/grey/black) for each cluster using Manhattan Distance in RGB color space
8. If there is a significant number of clusters of one color, call the image that color
9. If there is insignificant number of clusters of one color, pick between black/grey/white Contrast and entropy can be used to identify lower quality videos where it may be more difficult to classify vehicle colors. Images may be more difficult to classify due to the quality of the camera and the weather. For difficult to classify images, color classification may be bypassed entirely, or contrast and entropy used as additional metadata in our scoring logic.

The brightness of an image can be calculated using the below listed code sample (or other similar code, for example, for other color spaces):

```
def alt_brightness(img):
    stat=ImageStat.Stat(img)
    gs=(math.sqrt(0.241*(r**2)+0.691*(g**2)+0.068*
        (b**2))
        for r,g,b in imq.getdata( ))
    return sum(gs)/stat.count[0]
```

Entropy of an image can be computed as an image histogram in greyscale and then compute pixel entropy values. Entropy can be calculated using the below listed code sample (or other similar code, for example, for other color spaces):

```
def entropy(image, bit_instead_of_nat=False):
    image=Image.fromarray(image)
    image=
```

```
cv2.cvtColor(numpy.array(image.convert('RGB')),
cv2.COLOR_RGB2GRAY)
hist=color_hist(image)
h=np.asarray(hist, dtype=np.float64)
if h.sum( )=0 or (h<0).any( ):
    return None
    h=h/h.sum( )
    log_fn=np.ma.log 2 if bit_instead_of_nat else np.
        ma.log
    return−(h*log_fn(h)).sum( )
```

A tiered scoring model can be used for each classified vehicle:

High Confidence
Medium Confidence
Low Confidence

Scoring logic input can include the following:
CNN's (object detector) confidence on its object detection
Color model confidence
Image Quality In one aspect, detections are of the following or similar format:

{"name": "grey truck", "score name": "low", "score": 0.11078538000583649, "bounding box": [143, 55, 166, 70], "image_url": "https://storagelocation.abc.bizz/detection/123456789abc.jpg"}

As such, additional metadata that led to a predicted score can also be passed along. The idea is to be able to present the following information to an entity: "We detected a red truck here. This is a medium confidence detection because even though object detectors and color detectors are both be relative confident in their decisions, the vehicle was detected from a low quality video feed."

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A method comprising:
    receiving a request from an entity to detect vehicles of a specified color traveling on roadways within a geographic area;
    accessing a camera image of an unknown resolution and an unknown quality captured by a camera of an unknown configuration, wherein part of a roadway within the geographic area is within the field of view of the camera;
    determining a plurality of image characteristics of the camera image, including:
        detecting a darkness level in the camera image;
        computing a contrast from a plurality of different locations in the camera image; and
        calculating an entropy of the camera image;
    detecting a vehicle in the camera image taking into account at least some of the plurality of image characteristics;
    formulating one or more scored bounding boxes around the detected vehicle, including for each of one or more vehicle type specific detection models:
        computing a bounding box around the detected vehicle;
        calculating a vehicle confidence score that the detected vehicle is a specified vehicle type; and
    selecting another bounding box indicative of a specific vehicle type from the one or more bounding boxes based on calculated confidence scores;
    deriving a vehicle color from camera image pixel color values inside the selected other bounding box;
    computing a color confidence score that the derived vehicle color is the specified color based on: detecting the vehicle, the vehicle color, the darkness level, the contrast, and the entropy; and
    sending the vehicle detection, the derived vehicle color, and the computed confidence score to the entity in response to the request.

2. The method of claim 1, wherein deriving a vehicle color from camera image pixel color values comprises:
    using a convolutional neural network to compute a first color and corresponding first color confidence score and a second color and corresponding second color confidence score;
    determining that the first color confidence score is indicative of a higher confidence than the second color confidence score;
    matching the first color to the vehicle detection; and
    assigning a color confidence level to the first color based on the first color confidence score; and
    wherein sending the vehicle detection, the derived vehicle color, and the computed confidence score comprises sending the vehicle detection, the first color, and the confidence level.

3. The method of claim 1, wherein deriving a vehicle color from camera image pixel color values inside the selected bounding box comprises:
    dividing the content of the selected bounding box into a plurality of variable sized clusters;
    for each variable sized cluster included in the plurality of variable sized clusters:
        computing a mean color value of pixels contained in the variable sized cluster; and
        determining what percentage of the bounding box is accounted for by the variable sized cluster; and
    computing the vehicle color based on the mean color values and percentages.

4. The method of claim 1, wherein formulating one or more scored bounding boxes around the detected vehicle comprises formulating a plurality of bounding boxes around the detected vehicle; and
    wherein selecting a bounding box indicative of a specific vehicle type comprises filtering out the selected bounding box from the plurality of bounding boxes based on the confidence score calculated for the selected bounding box.

5. The method of claim 1, further comprising:
    querying a camera database; and
    receiving a list of cameras that have a field of view including at least a portion of the roadway.

6. The method of claim 1, wherein accessing a camera image comprises:
    receiving a video stream from a camera; and
    accessing the camera image from the video stream.

7. The method of claim 1, wherein accessing a camera image comprises:
    receiving a cached video stream from a storage device; and
    accessing the camera image from the cached video stream.

8. The method of claim 1, wherein detecting a vehicle in the camera image taking into account at least some of the plurality of image characteristics comprises detecting the vehicle based on at least two of: the darkness level, the contrast, or the entropy.

9. The method of claim 1, wherein computing a color confidence score comprises computing the color confidence score based on tiered scoring module.

10. The method of claim 1, wherein calculating an entropy comprises:
computing a greyscale image histogram; and
computing pixel entropy values.

11. A system comprising:
a processor;
system memory coupled to the processor and storing instructions configured to cause the processor to:
receive a request from an entity to detect vehicles of a specified color traveling on roadways within a geographic area;
access a camera image of an unknown resolution and an unknown quality captured by a camera of an unknown configuration, wherein part of a roadway within the geographic area is within the field of view of the camera;
determine a plurality of image characteristics of the camera image, including:
detect a darkness level in the camera image;
compute a contrast from a plurality of different locations in the camera image; and
calculate an entropy of the camera image;
detect a vehicle in the camera image taking into account at least some of the plurality of image characteristics;
formulate one or more scored bounding boxes around the detected vehicle, including for each of one or more vehicle type specific detection models:
compute a bounding box around the detected vehicle;
calculate a vehicle confidence score that the detected vehicle is a specified vehicle type; and
select another bounding box indicative of a specific vehicle type from the one or more bounding boxes based on calculated confidence scores;
derive a vehicle color from camera image pixel color values inside the selected other bounding box;
compute a color confidence score that the derived vehicle color is the specified color based on: detecting the vehicle, the vehicle color, the darkness level, the contrast, and the entropy; and
send the vehicle detection, the derived vehicle color, and the computed confidence score to the entity in response to the request.

12. The system of claim 11, wherein instructions configured to derive a vehicle color from camera image pixel color values comprise instructions configured to:
use a convolutional neural network to compute a first color and corresponding first color confidence score and a second color and corresponding second color confidence score;
determine that the first color confidence score is indicative of a higher confidence than the second color confidence score;
match the first color to the vehicle detection; and
assign a color confidence level to the first color based on the first color confidence score; and wherein instructions configured to send the vehicle detection, the derived vehicle color, and the computed confidence score comprise instructions configured to send the vehicle detection, the first color, and the confidence level.

13. The system of claim 11, wherein instructions configured to derive a vehicle color from camera image pixel color values inside the selected bounding box comprise instructions configured to:
divide the content of the selected bounding box into a plurality of variable sized clusters;
for each variable sized cluster included in the plurality of variable sized clusters:
compute a mean color value of pixels contained in the variable sized cluster; and
determine what percentage of the bounding box is accounted for by the variable sized cluster; and
compute the vehicle color based on the mean color values and percentages.

14. The system of claim 11, wherein instructions configured to formulate one or more scored bounding boxes around the detected vehicle comprise instructions configured to formulate a plurality of bounding boxes around the detected vehicle; and
wherein instructions configured to select a bounding box indicative of a specific vehicle type comprise instructions configured to filter out the selected bounding box from the plurality of bounding boxes based on the confidence score calculated for the selected bounding box.

15. The system of claim 11, further comprising instructions configured to:
query a camera database; and
receive a list of cameras that have a field of view including at least a portion of the roadway.

16. The system of claim 11, wherein instructions configured to access a camera image comprise instructions configured to:
receive a video stream from a camera; and
access the camera image from the video stream.

17. The system of claim 11, wherein instructions configured to access a camera image comprise instructions configured to:
receive a cached video stream from a storage device; and
access the camera image from the cached video stream.

18. The system of claim 11, wherein instructions configured to detect a vehicle in the camera image taking into account at least some of the plurality of image characteristics comprise instructions configured to detect the vehicle based on at least two of: the darkness level, the contrast, or the entropy.

19. The system of claim 11, wherein instructions configured to compute a color confidence score comprise instructions configured to compute the color confidence score based on tiered scoring module.

20. The method of claim 1, wherein instructions configured to calculate an entropy comprise instructions configured to:
compute a greyscale image histogram; and
compute pixel entropy values.

* * * * *